(12) United States Patent
Soreo et al.

(10) Patent No.: US 10,634,102 B2
(45) Date of Patent: Apr. 28, 2020

(54) FUEL PUMP ASSEMBLY

(71) Applicant: Nottingham Spirk Design Associates, Cleveland, OH (US)

(72) Inventors: Robert Soreo, Cleveland Heights, OH (US); Mike McKee, New Hudson, MI (US); Lindsey Tufts, Jr., Kent, OH (US); Ryan Gernheuser, Maumee, OH (US)

(73) Assignee: Trico Group, LLC, Cleveland, OH (US)

( * ) Notice: Subject to any disclaimer, the term of this patent is extended or adjusted under 35 U.S.C. 154(b) by 0 days.

(21) Appl. No.: 16/123,281

(22) Filed: Sep. 6, 2018

(65) Prior Publication Data

US 2020/0080524 A1  Mar. 12, 2020

(51) Int. Cl.
| | |
|---|---|
| *F04B 49/025* | (2006.01) |
| *F04B 49/04* | (2006.01) |
| *F02M 37/10* | (2006.01) |
| *B01D 35/027* | (2006.01) |
| *F02M 37/50* | (2019.01) |

(52) U.S. Cl.
CPC ....... *F02M 37/103* (2013.01); *B01D 35/0273* (2013.01); *F02M 37/106* (2013.01); *F04B 49/025* (2013.01); *F04B 49/04* (2013.01); *F02M 37/50* (2019.01)

(58) Field of Classification Search
CPC .... F02M 37/103; F02M 37/106; F02M 37/50; F04B 49/04; F04B 49/025; B01D 35/0273; B60K 2015/0772; B60K 2015/0319
USPC ......................................................... 417/40
See application file for complete search history.

(56) References Cited

U.S. PATENT DOCUMENTS

| | | | |
|---|---|---|---|
| 3,123,102 A | * | 3/1964 | Frieder et al. .......... F16L 57/04 138/125 |
| 4,157,968 A | | 6/1979 | Kronsbein |
| 4,350,909 A | | 9/1982 | Yamada |

(Continued)

FOREIGN PATENT DOCUMENTS

EP  0705971 A1  4/1996

OTHER PUBLICATIONS

International Search Report and Written Opinion for corresponding International Application No. PCT/US2019/049750 dated Feb. 25, 2020.

*Primary Examiner* — Dominick L Plakkoottam
*Assistant Examiner* — Connor J Tremarche
(74) *Attorney, Agent, or Firm* — Renner, Otto, Boisselle & Sklar, LLP

(57) ABSTRACT

A sender assembly that has a compact state, which may allow a pump assembly including the sender assembly to be easily inserted into an opening of a fluid tank. For example, the pump assembly may be insertable into the opening of the fluid tank while a longitudinal axis of the pump assembly remains coaxial with the opening. When in the compact state a rotatable arm and a float of the sender assembly may be entirely within or deformable to be within a predetermined envelope that has a radial extent less than the opening of the fluid tank to allow the sender assembly to be inserted straight into the opening. The predetermined envelope may be coaxial with the longitudinal axis and have a cross-section transverse to the longitudinal axis that matches the opening of the tank.

15 Claims, 13 Drawing Sheets

(56) References Cited

U.S. PATENT DOCUMENTS

| | | | |
|---|---|---|---|
| 4,706,707 A * | 11/1987 | Betterton | F02M 37/106 |
| | | | 137/434 |
| 4,919,103 A | 4/1990 | Ishiguro et al. | |
| 5,007,450 A | 4/1991 | Babb et al. | |
| 5,341,679 A | 8/1994 | Walkowski et al. | |
| 5,787,865 A | 8/1998 | Harris et al. | |
| 6,000,913 A | 12/1999 | Chung et al. | |
| 6,089,086 A * | 7/2000 | Swindler | G01F 23/38 |
| | | | 73/305 |
| 6,761,193 B1 * | 7/2004 | Cotton | F02M 37/103 |
| | | | 141/198 |
| 6,998,043 B2 | 2/2006 | Fischer et al. | |
| 7,093,485 B2 * | 8/2006 | Newman | G01F 23/32 |
| | | | 73/317 |
| 8,567,244 B2 * | 10/2013 | Farmanyan | G01F 23/36 |
| | | | 73/290 R |
| 2001/0010219 A1 | 8/2001 | Isobe et al. | |
| 2002/0170727 A1 | 11/2002 | Holland et al. | |
| 2004/0020289 A1 | 2/2004 | Gouzou et al. | |
| 2004/0123843 A1 * | 7/2004 | Kumagai | F02M 37/025 |
| | | | 123/509 |
| 2004/0129626 A1 | 7/2004 | Fischer et al. | |
| 2004/0182463 A1 | 9/2004 | Bessette et al. | |
| 2004/0261994 A1 | 12/2004 | Nguyen et al. | |
| 2007/0125344 A1 | 6/2007 | Troxler et al. | |
| 2007/0163659 A1 | 7/2007 | Uhara et al. | |
| 2007/0295648 A1 | 12/2007 | Falkiner et al. | |
| 2008/0245423 A1 | 10/2008 | Noda et al. | |
| 2012/0227237 A1 | 9/2012 | Tabuchi | |
| 2013/0025572 A1 | 1/2013 | Takata | |
| 2014/0345719 A1 | 11/2014 | Kim et al. | |

* cited by examiner

FUEL PUMP ASSEMBLY

RELATED APPLICATIONS

This application is related to a commonly-assigned concurrently filed application, "Fuel Pump Assembly" U.S. Patent Application No. 29/662,526 filed Sep. 6, 2018 issued under U.S. Pat. No. D871456 on Dec. 31, 2019), which is hereby incorporated by reference in its entirety.

FIELD OF INVENTION

The present invention relates generally to fluid pumps, and more particularly to fuel pump assemblies with sender assemblies.

BACKGROUND

Vehicles, such as consumer cars and trucks, with combustion engines often include a gas tank and an electronic pump assembly within the gas tank to pump gasoline. Often the gas tanks will include an annular hole at the top to receive the corresponding electronic pump assembly.

The electronic pump assemblies often include a sender unit to detect the level of gasoline in the gas tank. Previously known sender units are typically difficult to install since some level detection components of the sender units extend radially beyond the annular hole of the gas tank, which causes interference with the gas tank when inserting the electronic pump assemblies into the annular hole.

SUMMARY OF INVENTION

The present invention provides a sender assembly that has a compact state, which may allow a pump assembly including the sender assembly to be easily inserted into an opening of a fluid tank. For example, the pump assembly may be insertable into the opening of the fluid tank while a longitudinal axis of the pump assembly remains coaxial with the opening. When in the compact state a rotatable arm and a float of the sender assembly may be entirely within or deformable to be within a predetermined envelope that has a radial extent less than the opening of the fluid tank to allow the sender assembly to be inserted straight into the opening. The predetermined envelope may be coaxial with the longitudinal axis and have a cross-section transverse to the longitudinal axis that matches the opening of the tank.

A wiper of the sender assembly may be movable beyond a maximum or minimum position away from the other, the rotatable arm may be flexible, and/or the rotatable arm may have a zig-zag shape. Any of the above features may be used individually or in combination with one another.

According to one aspect of the invention, a pump assembly extends along a longitudinal axis. The pump assembly includes a cover at an external end of the pump assembly, the cover including a flange that extends radially outward of the longitudinal axis, an insertable end opposite the external end along the longitudinal axis, a fluid pump disposed between the insertable end and the flange, and a sender assembly for detecting a fluid level in the fluid tank, the sender assembly being disposed between the insertable end and the flange. The sender assembly is configured to transition into a compact state where the insertable end and the flange would be able to move straight along the longitudinal axis from a position where the insertable end initially enters an opening, with a radial extent that is less than the flange, to a position where the flange engages the fluid tank.

According to another aspect of the invention, a sender assembly for detecting a fluid level in a fluid tank. The sender assembly includes a sender housing, a variable resistor with a positive end and a grounded end opposite the positive end, a rotatable arm that has a pivot end and a revolvable end that is rotatably fixed relative to the pivot end and configured to revolve about the pivot end, wherein the rotatable arm is pivotably mounted at a position that is fixed relative to the variable resistor at the pivot end such that the revolvable end is movable relative to the sender housing, and a wiper that is rotatably fixed relative to the pivot end such that the wiper revolves about the pivot end when the rotatable arm revolves about the pivot end, wherein the wiper is engageable with the variable resistor such that revolving the wiper about the pivot end in a first rotation direction between the positive end and the grounded end progressively increases an electrical resistance, between the positive end and the grounded end, from a minimum resistance toward a maximum resistance or progressively decreases the electrical resistance from the maximum resistance toward the minimum resistance. When the revolvable end revolves about the pivot end in the first rotation direction the wiper revolves about the pivot end in the first rotation direction, and the wiper is configured to stop revolving in the first direction when the wiper reaches a first position where the electrical resistance is one of the maximum resistance or the minimum resistance, the wiper is configured to be revolvable away from the first position to a second position where the electrical resistance is the other of the maximum resistance or the minimum resistance, and the wiper is configured to be revolvable to a third position, beyond the second position away from the first position, where the wiper would be at least partially disengaged from the variable resistor.

According to another aspect of the invention, a method of assembling a tank assembly that includes a fluid tank and a pump assembly, which includes a flange spaced apart from an insertable end of the pump assembly along a longitudinal axis and includes a sender assembly disposed between the insertable end and the flange. The method includes inserting the insertable end axially along the longitudinal axis into the opening until the flange engages the fluid tank, wherein the insertable end and the flange move straight along the longitudinal axis from a position where the insertable end initially enters the opening to a position where the flange engages the fluid tank.

Any of the above aspects may be combined with any one or all of the other aspects.

The foregoing and other features of the invention are hereinafter described in greater detail with reference to the accompanying drawings.

DETAILED DESCRIPTION

The principles of this present application have particular application to automobile fuel tank assemblies with a fuel tank and a fuel pump assembly that pumps fuel out of the fuel tank and detects a level of fuel in the fuel tank, such as the level of gasoline in the fuel tank, and thus will be described below chiefly in this context. It will be appreciated that principles of this invention may be applicable to other fluid tank assemblies with fluid tanks where it is desirable to detect levels of fluid in the fluid tanks, such as in a fuel tank of an aircraft or another fluid tank.

Figure 1:
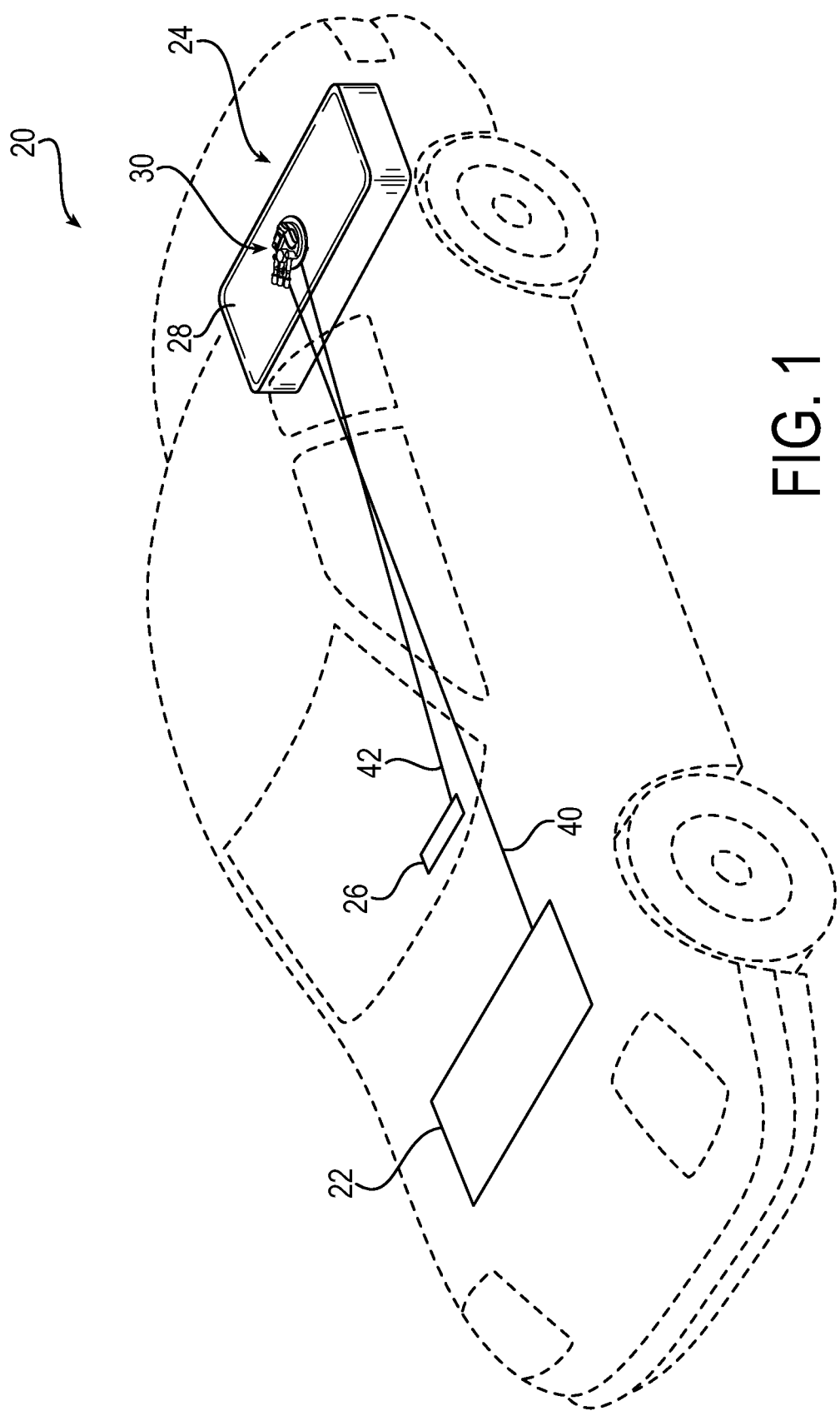
FIG. 1 is an oblique view of a vehicle including an exemplary fuel tank assembly with an exemplary fuel pump assembly.

Referring now in detail to the drawings, and initially to FIG. 1, a vehicle 20 (e.g., a car—as shown in dashed lines, or another vehicle discussed above) according to one embodiment is illustrated. In another embodiment, the vehicle is a truck or an aircraft.

The vehicle 20 includes a combustion engine assembly 22, a fuel tank assembly 24, and a dashboard readout 26. The fuel tank assembly 24 includes a fuel tank 28 and a fuel pump assembly 30 attached to and inserted into the fuel tank 28 to pump fuel from the fuel tank 28 and detect the level of fuel in the fuel tank 28.

The fuel pump assembly 30 (an example of a pump assembly) is fluidly connected to the combustion engine assembly 22 via a fuel line 40 (an example of a fluid line) to provide fuel to the combustion engine assembly 22 so that the combustion engine assembly is able to provide motive power for the vehicle 20. Also, the fuel pump assembly 30 is operably connected to the dashboard readout 26 via a communication line 42 such that the dashboard readout 26 indicates the level of fuel in the fuel tank assembly 24 to a driver of the vehicle 20.

Figure 2:
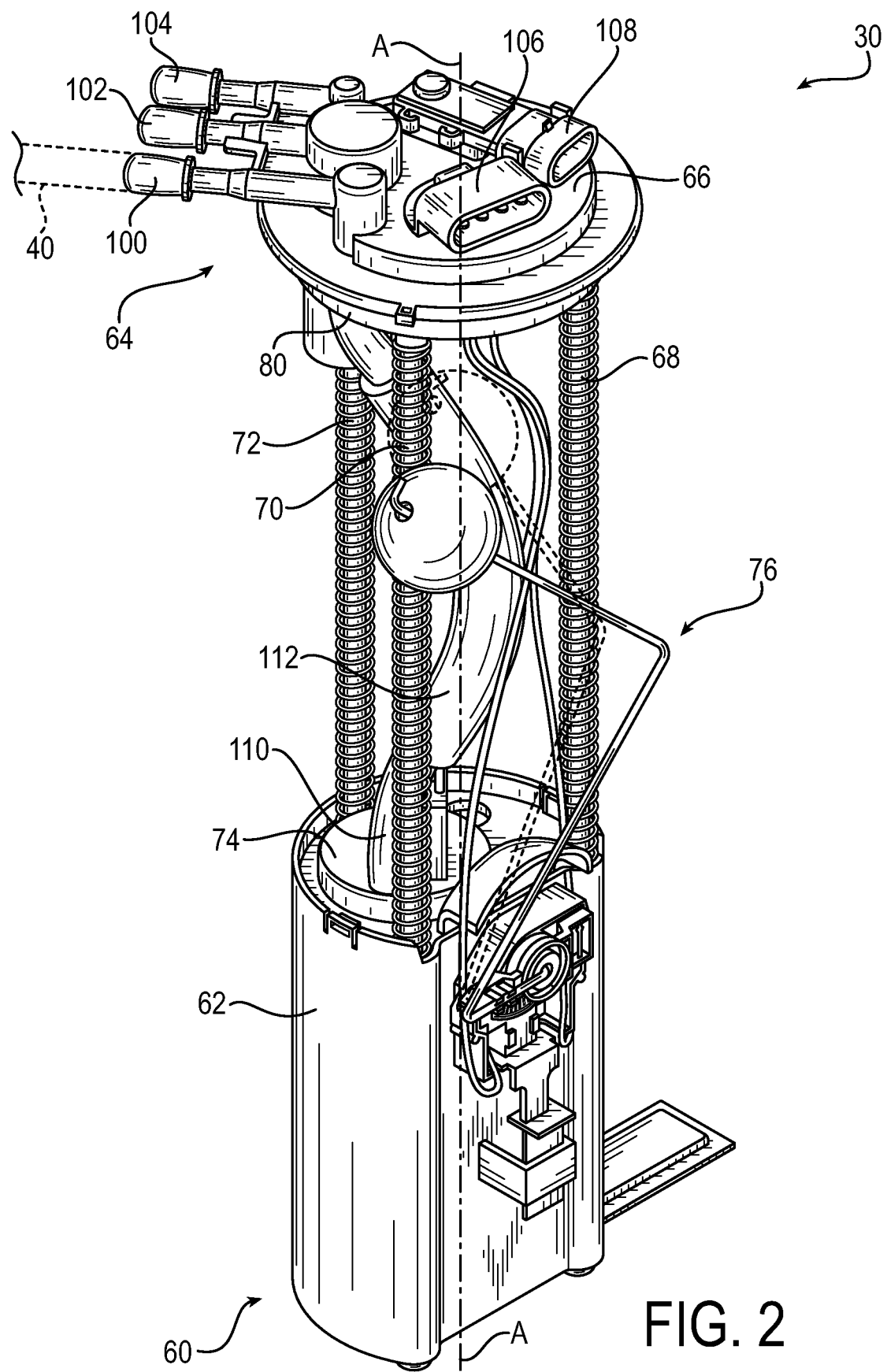
FIG. 2 is an oblique view of the fuel pump assembly of FIG. 1.

Turning to FIG. 2, the fuel pump assembly 30 is illustrated alone. The fuel pump assembly 30 extends along a longitudinal axis A, and includes an insertable end 60 with a reservoir housing 62 and an external end 64 that remains external to the fuel tank 28 when the insertable end 60 is disposed entirely within the fuel tank 28, as shown in FIG. 1. The fuel pump assembly 30 includes a top cover 66 at the external end 64, retractable support rods 68, 70, and 72 attached to the top cover 66 and the reservoir housing 62, a fuel pump 74 disposed between the top cover 66 and the insertable end 60, and a sender assembly 76 fixed to the reservoir housing 62.

The top cover has a radial center disposed on the longitudinal axis and includes a radial flange 78 and an insertable wall 80. The radial flange 78 extends radially outward of the longitudinal axis beyond the insertable wall 80 from a central body of the top cover 66 such that the insertable wall 80 can fit into the fuel tank 28 (shown in FIG. 1) and radial flange 78 is engageable with an external face of the fuel tank 28 when the insertable wall 80 is inserted.

The top cover 66 also includes a fuel outlet port 100 connectable to the fuel line 40 (shown schematically with dashed lines), a vent port 102 for venting pressure or vacuum in the fuel tank 28, a return inlet port 104, a sender plug 106 in communication with the sender assembly 76, and a fuel pump plug 108 in communication with the fuel pump 74.

The insertable end 60 has a radial center disposed on the longitudinal axis A and is axially opposite the external end 64 along the longitudinal axis A. For example, the longitudinal axis A extends perpendicularly through the bottom of the reservoir housing 62 and the top of the top cover 66 and the top cover is spaced from the reservoir housing by the retractable support rods 68, 70, and 72.

The retractable support rods 68, 70, and 72 allow the reservoir housing 62 and the top cover 66 to move toward one another so that the fuel pump assembly 30 can axially expand and contract when placed into the fuel tank 28 (shown in FIG. 1). Also, the retractable support rods 68, 70, and 72 are spring biased to urge the top cover 66 and the reservoir housing 62 apart from one another.

The fuel pump 74 is disposed in the reservoir housing 62 between the disposed between the insertable end 60 and the radial flange 78. An outlet of the fuel pump 74 is fluidly connected to the fuel outlet port 100 by a fuel tube 110 so that the fuel pump 74 can provide fuel to the fuel line 40. An abrasion sleeve 112 circumscribes a length of the fuel tube 110 to cover the surfaces of the fuel tube 110 that would otherwise be contactable with the springs of the retractable support rods 68, 70, and 72 so that the fuel tube 110 is protected against wear caused by the fuel tube 110 repeatedly rubbing against the springs.

Figure 3:
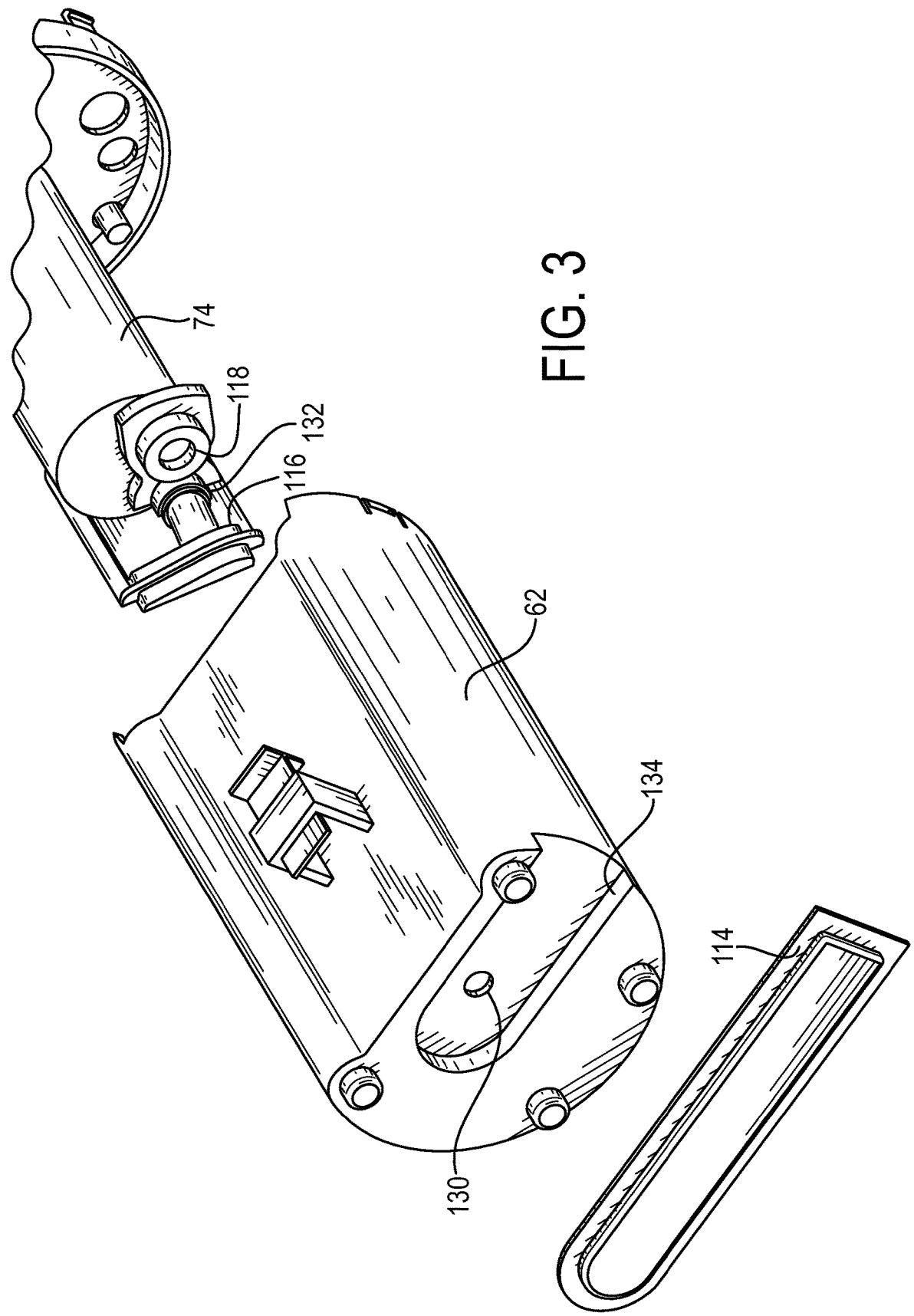
FIG. 3 is an oblique exploded view of an insertable end of the fuel pump assembly of FIG. 2.

Turning briefly to FIG. 3, the fuel pump assembly 30 further includes an external filter 114 and an internal filter 116. The external filter 114 and the internal filter 116 both include multilayered filtration material. For example, a coarse outer layer that separates relatively large debris from the fuel, a middle layer that separates debris that passes through the coarse layer, and a fine layer that separates fine particles from the fuel.

The external filter 114 is flexible and external to an interior of the reservoir housing 62 and fluidly connectable to an external filter port 118 (an example of a first input port) of the fuel pump 74 through a through hole 130 in the reservoir housing 62. The internal filter 116 is disposable within the interior of the reservoir housing 62 and fluidly connected to an internal filter port 132 (an example of a second input port) of the fuel pump 74. When the fuel pump assembly 30 is assembled, the internal filter 116 is disposed within the interior of the reservoir housing 62 and fluidly connected to the internal filter port 132, and the external filter 114 is partially disposed in an external filter cavity 134 external to the interior of the reservoir housing 62.

Figure 4:
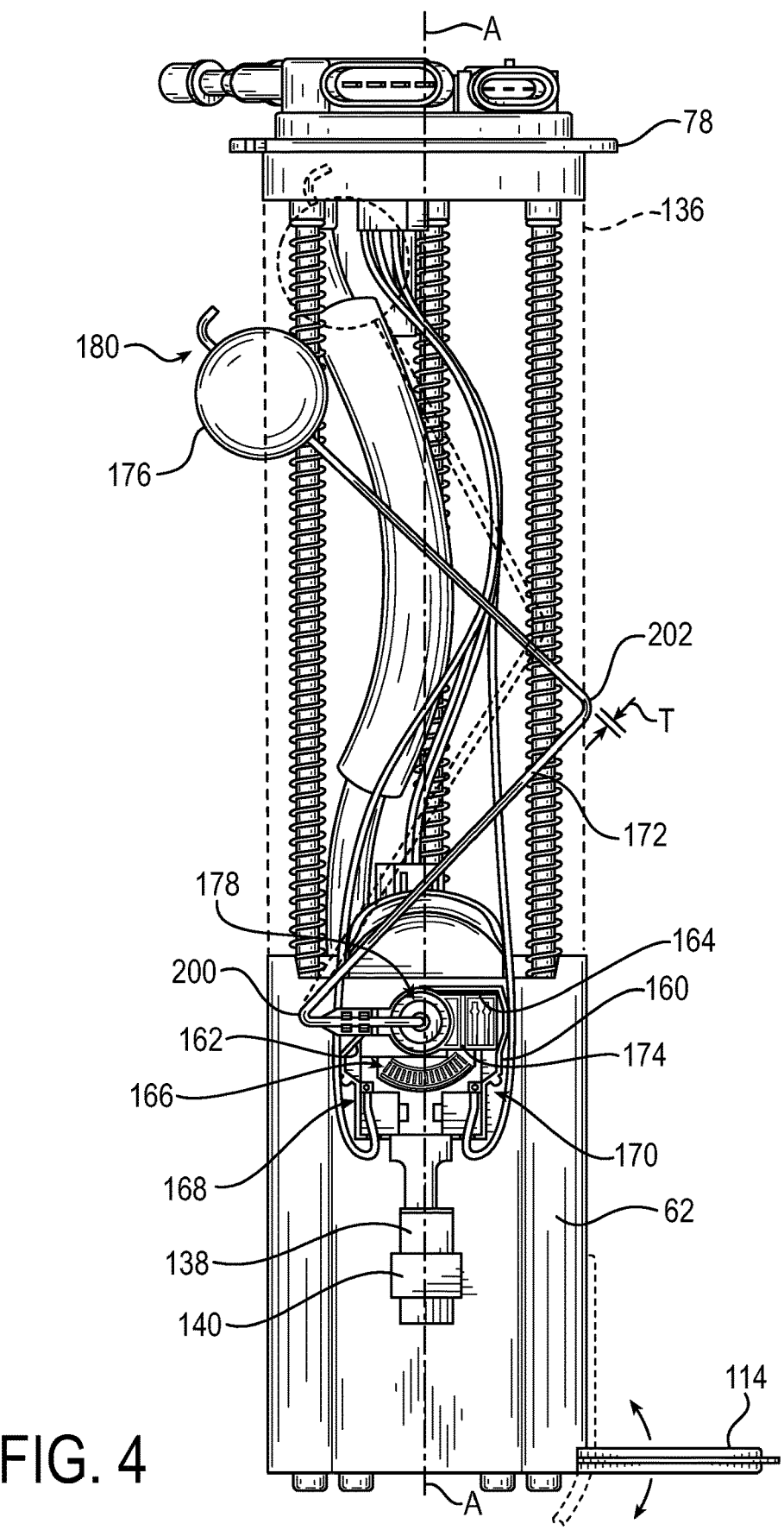
FIG. 4 is a front view of the fuel pump assembly of FIG. 2 including an exemplary sender assembly.

Turning to FIG. 4, the portion of the external filter 114 protruding radially from the reservoir housing 62 is configured to resiliently deform so that the radially outermost extent is less than or about the same as the reservoir housing 62. For example, as shown in dashed lines, the external filter 114 can be resiliently bent away from the radial flange 78 and extend radially inward of an imaginary envelope 136 (shown in dashed lines) that is cylindrical and extends axially from an outermost periphery of the radial flange 78. In an embodiment, the imaginary envelope has a radial extent that is 10-40%, 15-30%, or 20-25% less than that of the flange. In the illustrated embodiment, the external filter 114 may bend 90° or approximately 90° so that the portion of the external filter 114 extending radially from the reservoir housing 62 may be parallel or approximately parallel to the near wall of the reservoir housing 62; in other words, the external filter 114 may bend 90° or approximately 90° so that the portion of the external filter 114 extending radially from the reservoir housing 62 may be parallel or approximately parallel to the longitudinal axis A.

As also shown in dashed lines, the external filter 114 can be resiliently bent toward the radial flange 78 and have a radial extent less than that of the radial flange 78 and slightly larger than that of the imaginary envelope 136. In an embodiment, the external filter can be disposed in a different location such that bending of the external filter is not necessary to have a radial extent less than the imaginary envelope 136. In another embodiment, the reservoir housing 62 and the external filter 114 are configured such that the external filter 114 is resiliently bendable toward the radial flange 78 and has a radial extent less than or equal that of the imaginary envelope 136. In one embodiment, the external filter 114 can be resiliently bent toward the radial flange 78, not by hand, but by interaction of the external filter 114 with a gas tank 28 as the fuel pump assembly 30 is inserted in an opening 220 of the fuel tank 28. The external filter 114 may bend 90° or approximately 90° upon interaction with the gas tank 28 so that the portion of the external filter 114 extending radially from the reservoir housing 62 may be parallel or approximately parallel to the longitudinal axis A. In an embodiment, the external filter can be disposed in a different location such that bending of the external filter is not necessary to have a radial extent less than the imaginary envelope 136.

Still referring to FIG. 4, the sender assembly 76 is illustrated in a compact state, which the sender assembly 76 is configured to transition into and out of, as will be discussed below with reference to FIGS. 8-11. The sender assembly 76 is able to detect a fluid level in the fuel tank 28 (shown in FIG. 1) and is disposed between the insertable end 60 and the radial flange 78. The sender assembly 76 is fixed to a front face of the reservoir housing 62. For example, the sender assembly 76 is fixed to a front face of the reservoir housing 62 to a lever 138 of the sender assembly 76 that is fixedly connected to a loop 140 protruding radially from the front face of the reservoir housing 62. In another embodiment, the sender assembly is fixed to the reservoir housing in another manner, such as with an adhesive or a mechanical fastener, or is fixed to another portion of the sender assembly between the insertable end and the flange.

The sender assembly 76 includes a sender housing 160 that forms a first stop surface 162 and a second stop surface 164, a variable resistor 166 having a positive end 168 and a grounded end 170 opposite the positive end 168, a rotatable arm 172, a wiper 174, and a float 176. The variable resistor 166 has silver contacts formed in an arcuate shape for engagement with the wiper 174. In an embodiment, another variable resistor is used to engage the wiper 174, such as a variable resistor with gold or copper contacts.

The rotatable arm 172 has a pivot end 178 and a revolvable end 180 that is rotatably fixed relative to the pivot end 178 and configured to revolve about the pivot end 178. The rotatable arm 172 is pivotably mounted at a position that is fixed relative to the variable resistor 166 at the pivot end 178 such that the revolvable end 180 is movable relative to the sender housing 160. For example, the rotatable arm 172 is formed by a wire with a zig-zag shape including bent portions 200 and 202 within a plane parallel to the longitudinal axis A and the pivot end 178 is rotatably journaled to the sender housing 160.

Figure 5:
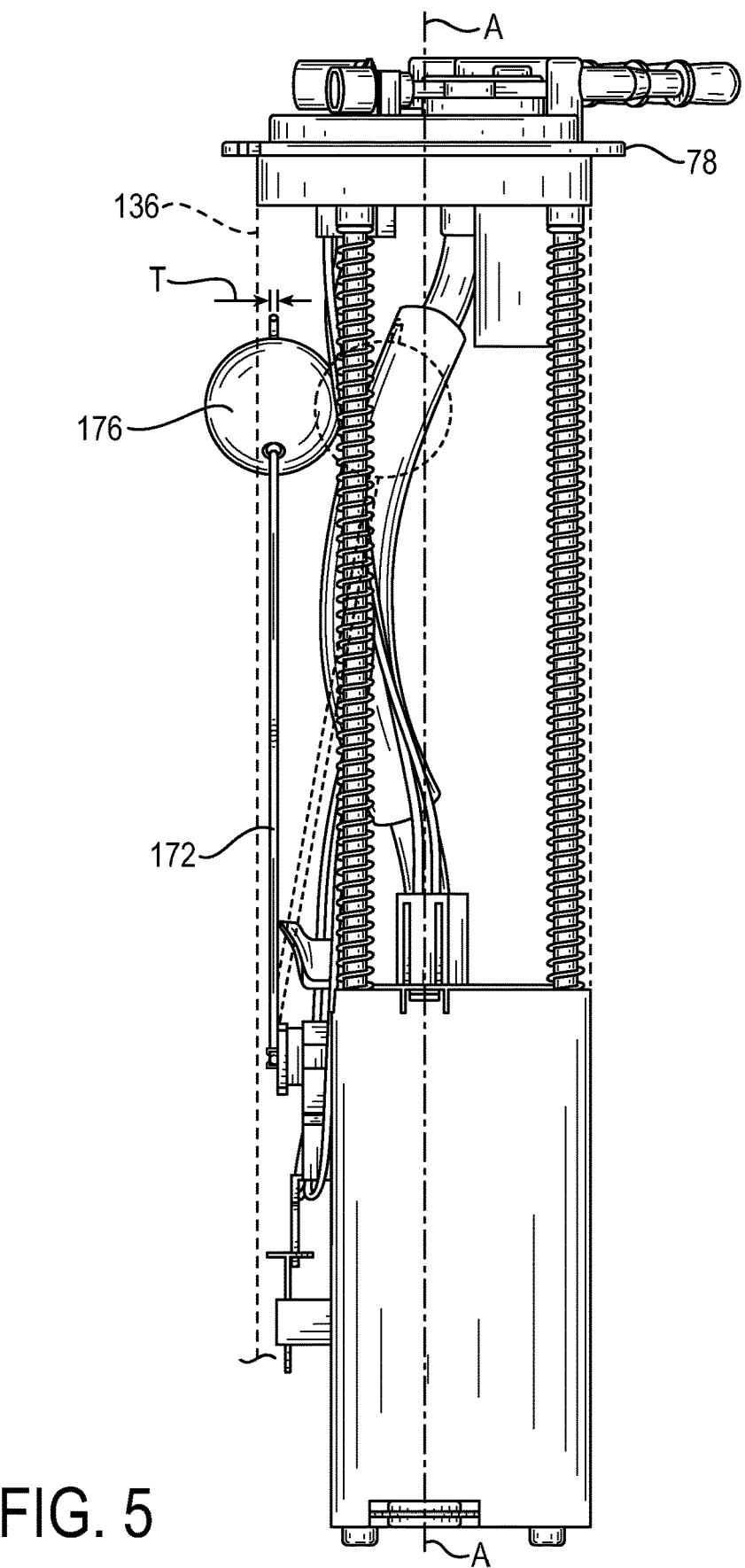
FIG. 5 is a right side view of the fuel pump assembly of FIG. 4.

The entire zig-zag shape extends out of the plane only a thickness of the wire. For example, as shown in FIGS. 4 and 5, the wire has a thickness T and the zig-zag shape extends into the page illustrating FIG. 4 a depth equal to the thickness T.

Still referring to FIG. 4, the rotatable arm 172 is flexible such that when the rotatable arm 172 is in the compact position the rotatable arm 172 is resiliently bendable into a position (shown in dashed lines in FIGS. 2 and 4-6), where the rotatable arm 172 has a radial extent less than the radial flange 78 and is entirely within the imaginary envelope 136. For example, the rotatable arm 172 is made of stainless steel and is resiliently bendable at each bent portion 200 and 202 so that the rotatable arm 172 is able to reduce its radial extent within a given plane transverse to the longitudinal axis A to be less than that of the radial flange 78.

In another embodiment, the rotatable arm is made of another flexible material, such as aluminum. In a further embodiment, the rotatable arm has a radial extent less than the opening of the tank without resiliently deforming the rotatable arm.

The float 176 is coupled to the revolvable end 180 and is buoyant in the fuel so that the revolvable end 180 is able to move with the level of fuel in the fuel tank 28. In an embodiment, the float is hollow and/or made of a buoyant material.

Figure 6:
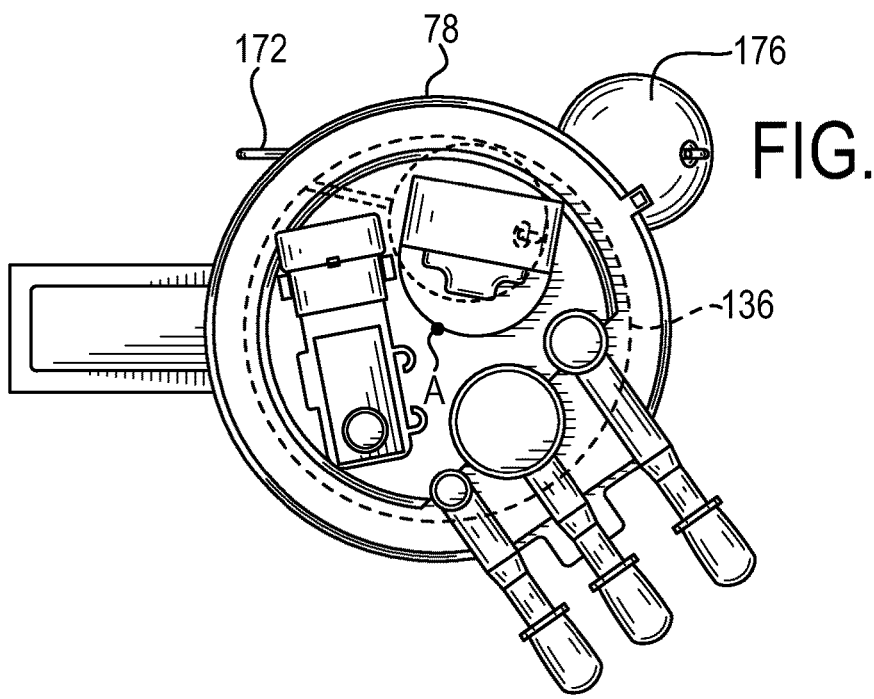
FIG. 6 is a top view of the fuel pump assembly of FIG. 4 including a top cover with a flange.

Referring now to FIGS. 4-6, the float 176 is movable to a position where the float 176 is entirely radially inward of a radial extent of the radial flange 78 and the imaginary envelope 136, as shown in dashed lines. For example, the float 176 can be urged radially inward toward the longitudinal axis A to fit within the imaginary envelope 136.

Figure 7:
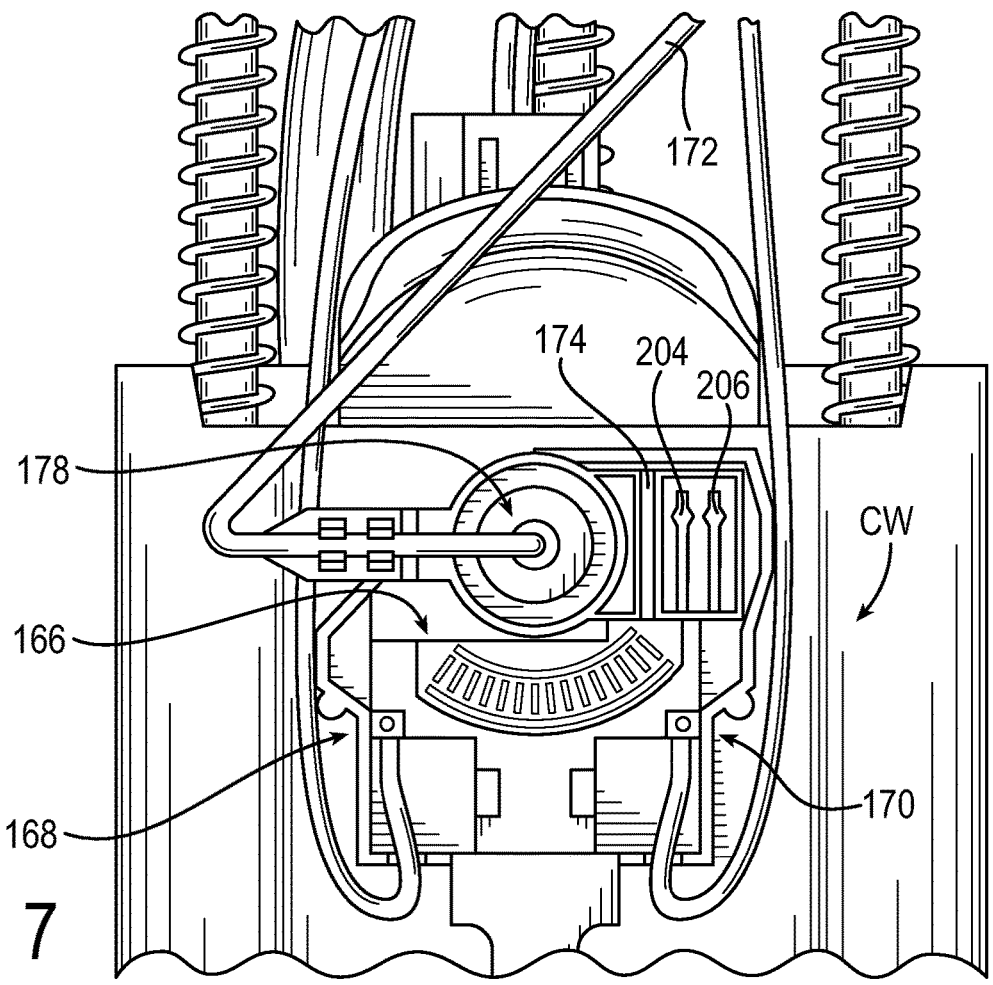
FIG. 7 is a front view of part of the fuel pump assembly with the sender assembly of FIG. 2.

Turning to FIG. 7, the rotatable arm 172, the variable resistor 166 (schematically shown), and the wiper 174 are shown in more detail. The wiper 174 is rotatably fixed relative to the pivot end 178 such that the wiper 174 revolves about the pivot end 178 when the rotatable arm 172 revolves about the pivot end 178, as will be discussed further below with reference to FIGS. 8-12. The wiper 174 is engageable with the variable resistor 166 such that revolving the wiper 174 about the pivot end 178 in a clockwise rotation direction CW (e.g., when the float 176 (shown in FIG. 8) lowers in the fuel tank 28 (shown in FIG. 13) with diminishing fuel) between the positive end 168 and the grounded end 170 progressively increases an electrical resistance, between the positive end 168 and the grounded end 170, toward a maximum resistance.

Accordingly, revolving the wiper 174 about the pivot end 178 in a counter-clockwise rotation direction CW (e.g., when the float 176 raises in the fuel tank 28 with increasing fuel) between the positive end 168 and the grounded end 170 progressively decreases the electrical resistance toward a minimum resistance. In an embodiment, the electrical resistance progressively decreases when revolving the wiper in the clockwise rotation direction and progressively increases when revolving the wiper in the counter-clockwise rotation direction.

Still referring to FIG. 7, the rotatable arm 172 and the wiper 174 are in a position where the wiper 174 is entirely disengaged from the variable resistor 166, 45° beyond a minimum resistance position of the wiper 174. In an embodiment, the wiper 174 is configured to rotate between 30° and 60° beyond the minimum resistance position or beyond the maximum resistance position to be at least partially disengaged or entirely disengaged from the variable resistor.

The wiper 174 includes contact pins 204 and 206 (schematically shown), which are configured to engage the variable resistor 166 such that when the contact pins 204 and 206 move from the grounded end 170 to the positive end 168 the resistance progressively increases since more resistive material would be along the current path from the positive end 168 to the grounded end 170. Accordingly, an amount of current flowing from the positive end 168 to the grounded end 170 would decrease. Alternatively, as the contact pins 204 and 206 move from the positive end 168 to the grounded end 170 the resistance progressively decreases since less resistive material would be along the current path from the positive end 168 to the grounded end 170. Accordingly, an amount of current flowing from the positive end 168 to the grounded end 170 would increase.

Figure 8:
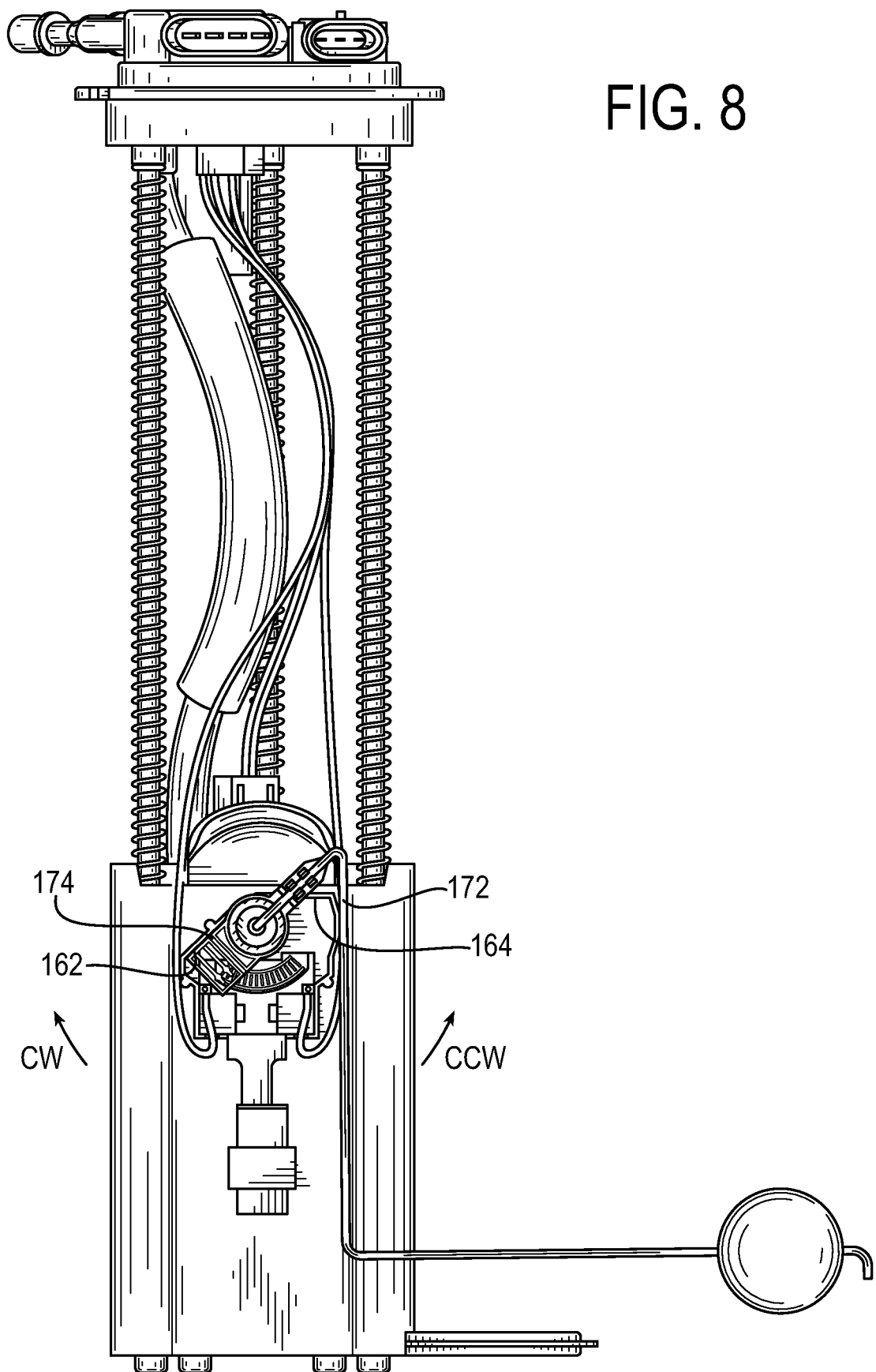
FIG. 8 is a front view of the fuel pump assembly of FIG. 2 with the sender assembly in a minimum fuel state when a wiper of the sender assembly is in a maximum resistance position.
Figure 9:
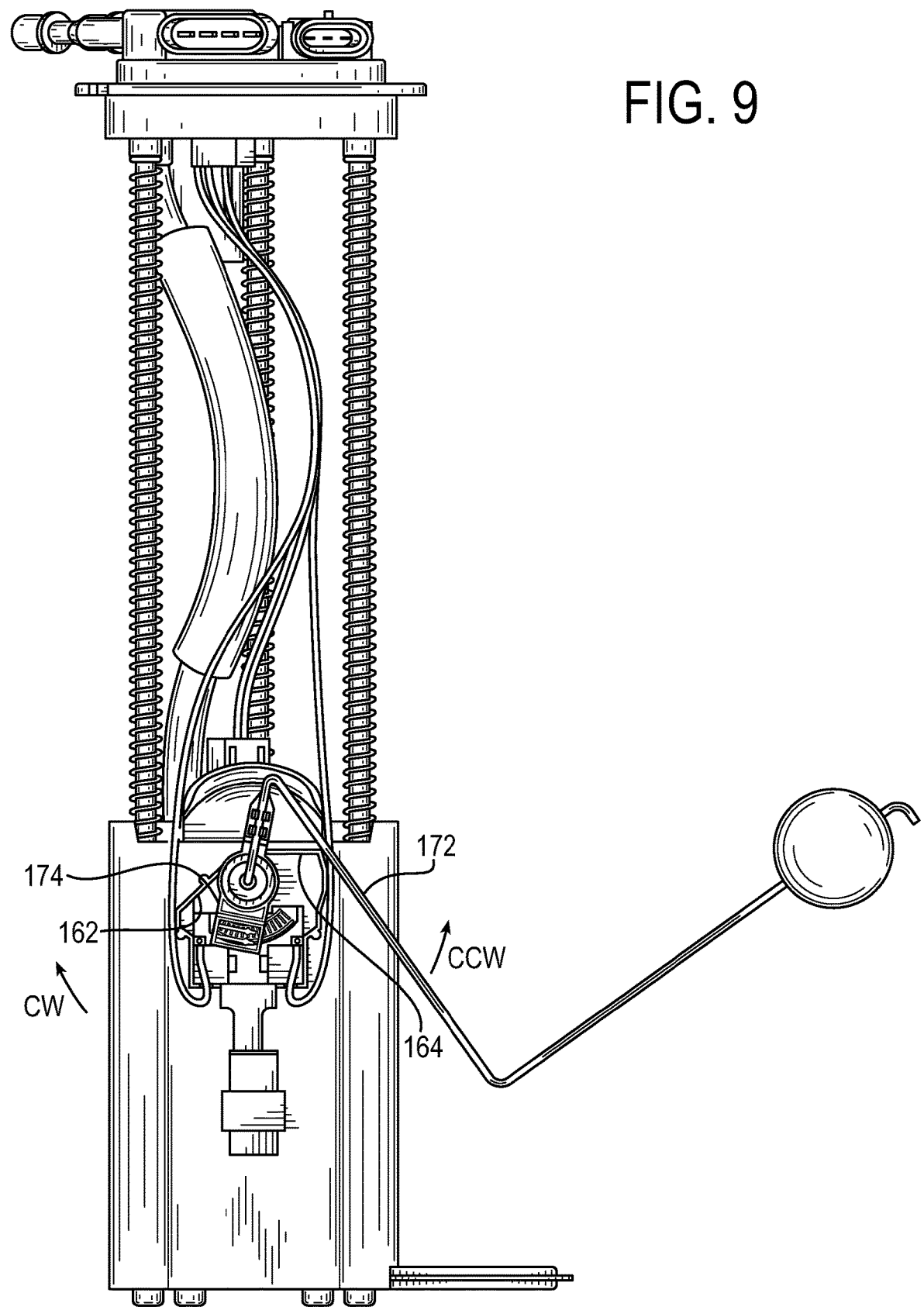
FIG. 9 is a front view of the fuel pump assembly of FIG. 8 with the sender assembly in an intermediate fuel state when the wiper is between the maximum resistance position and a minimum resistance position.
Figure 10:
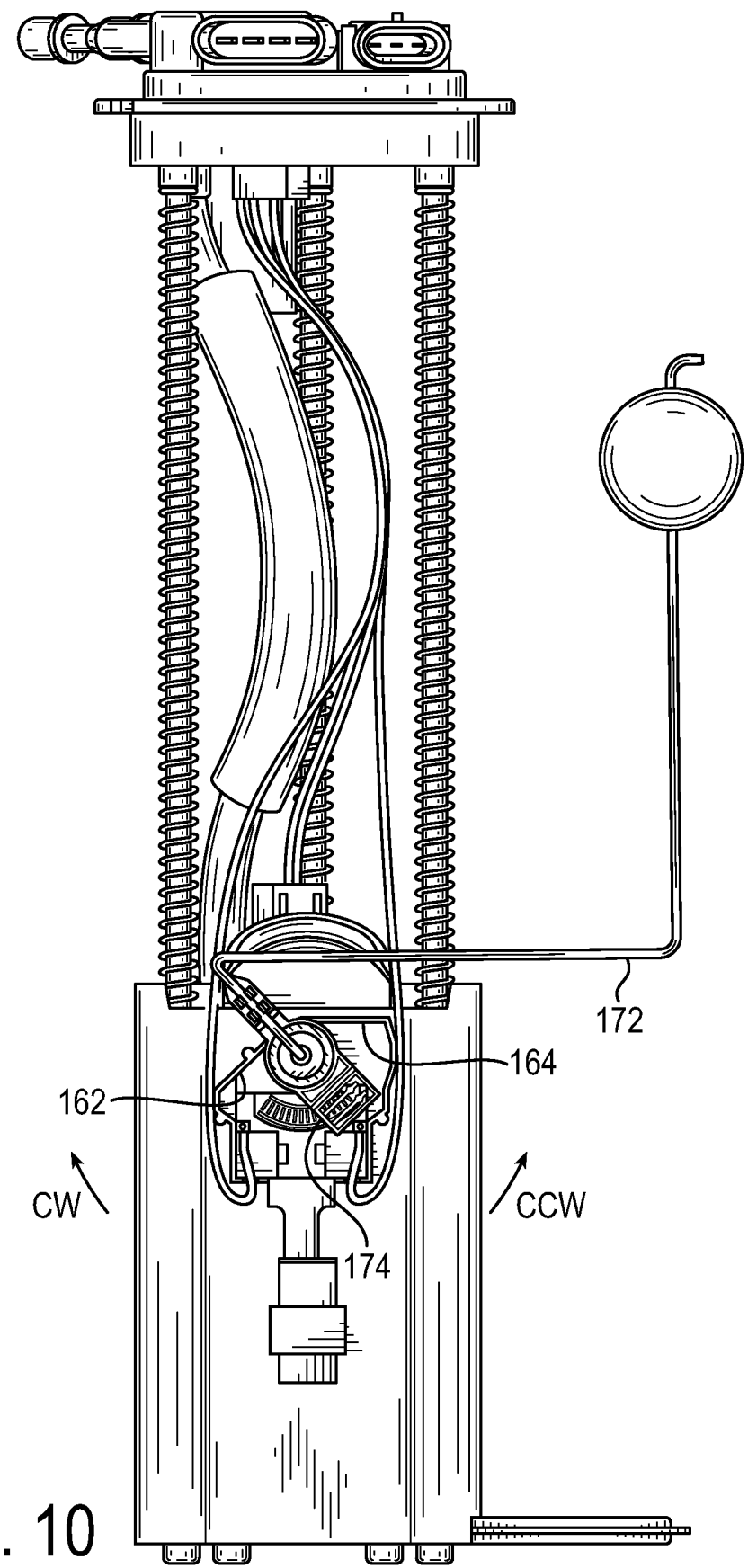
FIG. 10 is a front view of the fuel pump assembly of FIG. 9 with the sender assembly in a maximum fuel state when the wiper is in the minimum resistance position.

FIGS. 8-12 illustrate movement of the wiper 174 with the rotatable arm 172 at first clockwise CW (indicating fuel is diminishing) to the first stop surface 162 and then counter-clockwise CCW (indicating fuel is increasing) toward the second stop surface 164. As shown in FIG. 8, the wiper 174 can move clockwise CW with the rotatable arm 172 until the wiper 174 reaches a maximum resistance position (indicating the fuel tank 28 (shown in FIG. 13) is empty) where the wiper 174 contacts the first stop surface 162. As shown in FIGS. 9 and 10, the wiper 174 can move counter-clockwise CCW with the rotatable arm 172 until the wiper 174 reaches the minimum resistance position (indicating the fuel tank 28 is full).

Figure 11:
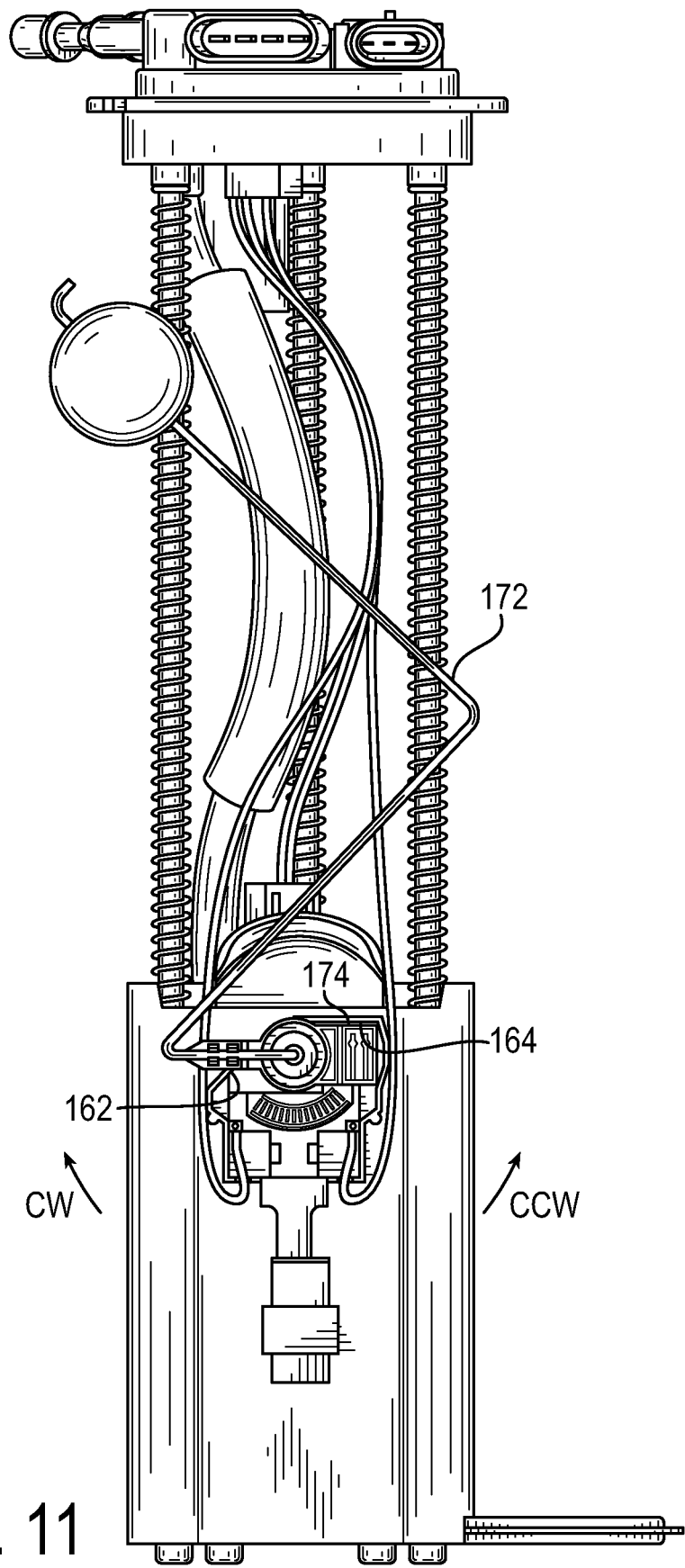
FIG. 11 is a front view of the fuel pump assembly of FIG. 10 with the sender assembly in a compact state when a wiper of the sender assembly is in a disengaged position.

As shown in FIG. 11, the wiper 174 can continue moving counter-clockwise CCW with the rotatable arm 172 beyond the minimum resistance position away from the maximum resistance position, to a disengaged position where the rotatable arm is in the compact position, just before the wiper 174 engages the second stop surface 164.

Figure 12:
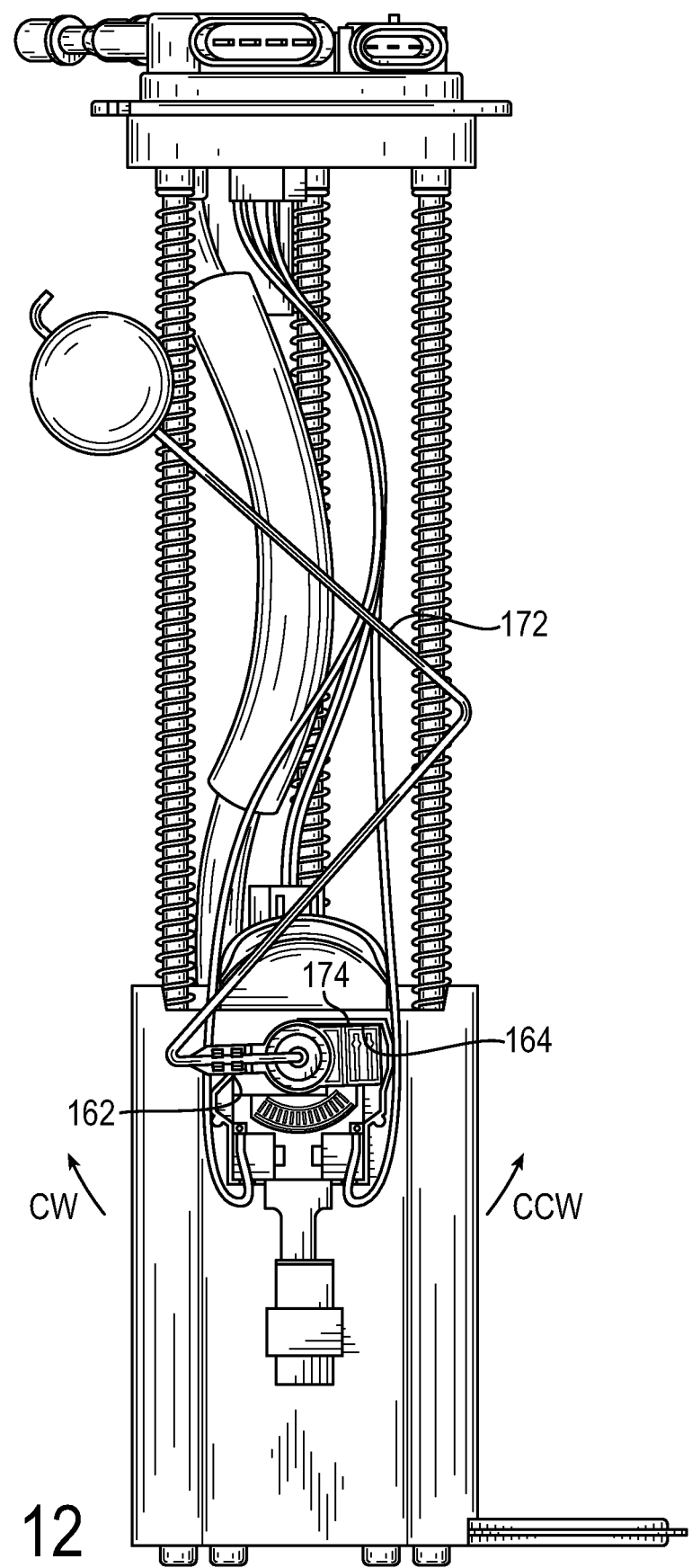
FIG. 12 is a front view of the fuel pump assembly of FIG. 11 with a wiper of the sender assembly engaging a stop.

FIG. 12 illustrates that the wiper 174 can continue moving counter-clockwise with the rotatable arm 172 to engage the second stop surface 164. In an embodiment, the second stop surface is configured to abut the wiper when the rotatable arm reaches the compact position so that the rotatable arm is prevented from rotating counter-clockwise CCW beyond the compact position.

Figure 13:
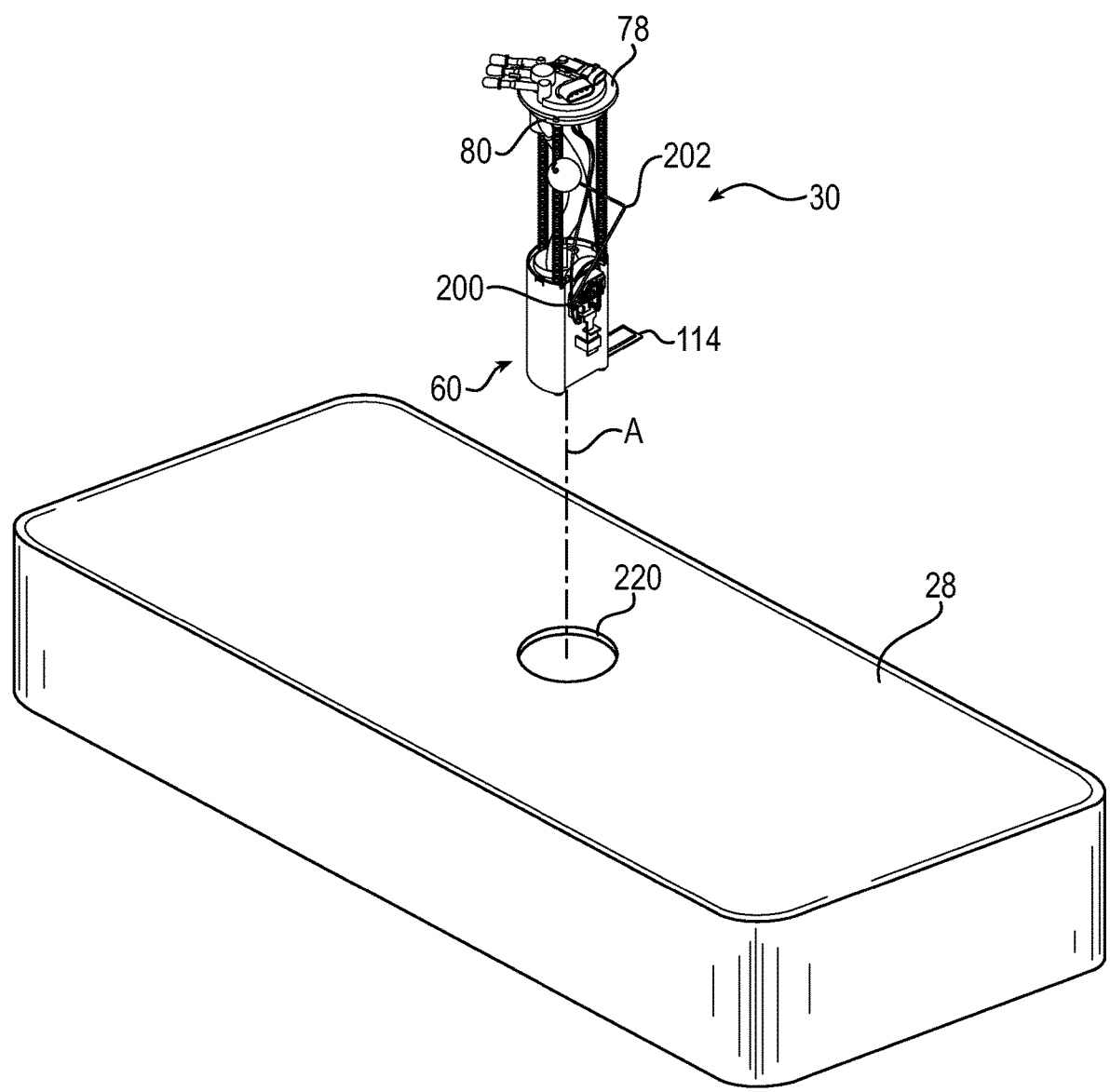
FIG. 13 is an oblique exploded view of the fuel tank assembly of FIG. 1 including a fuel tank with an opening, where the fuel pump assembly is in the compact state and is being inserted along a longitudinal axis into the opening.
Figure 14:
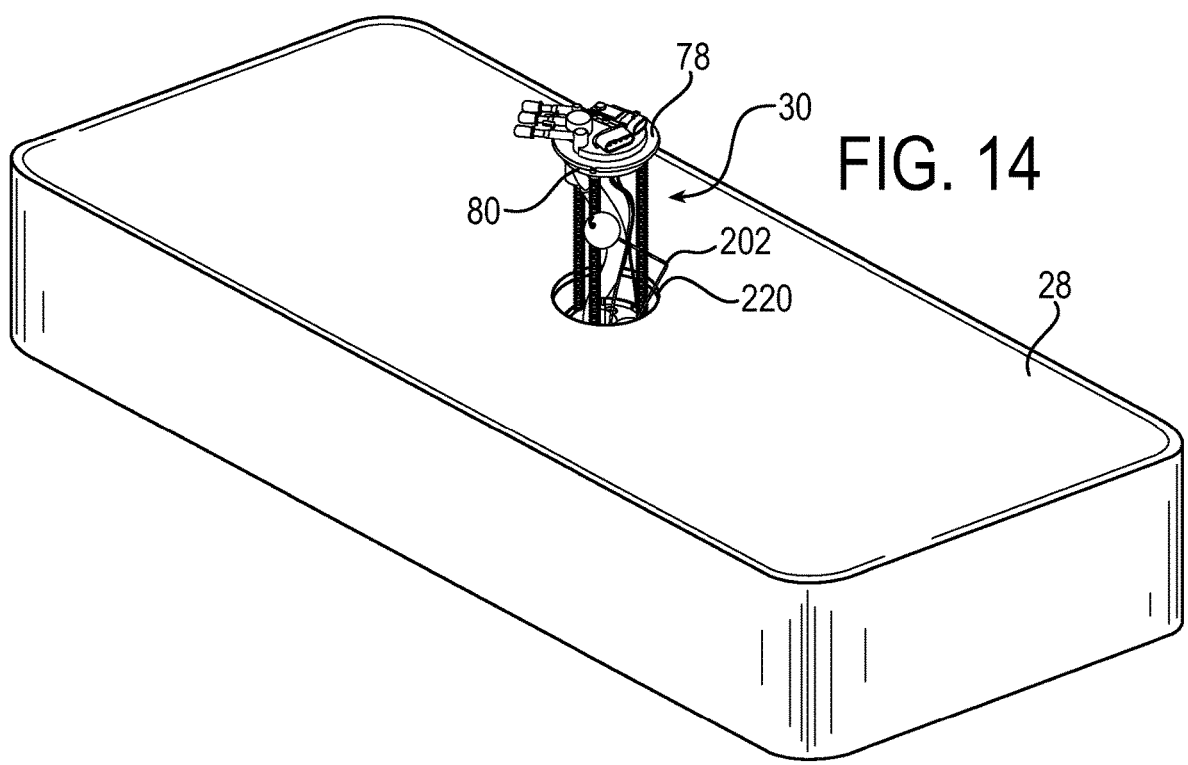
FIG. 14 is an oblique partially-exploded view of the fuel tank assembly of FIG. 13, where the fuel pump assembly is partially inserted into the opening.
Figure 15:
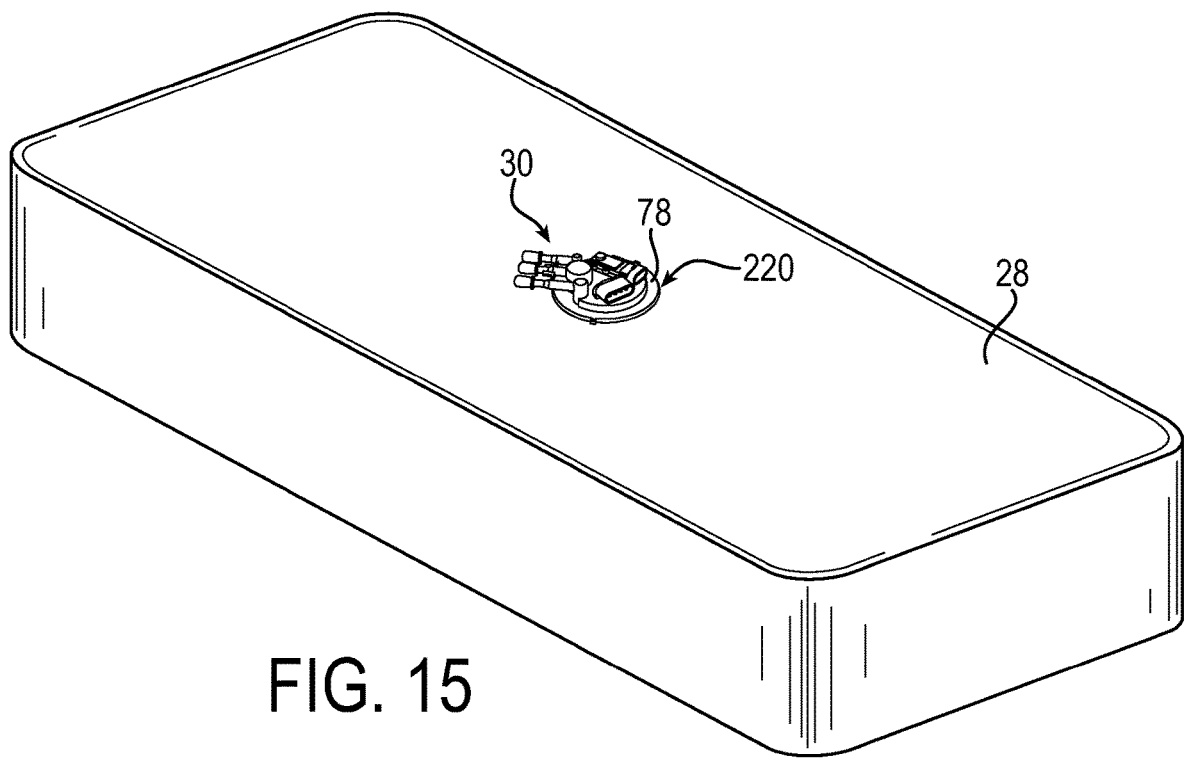
FIG. 15 is an oblique view of the fuel tank assembly of FIG. 14, where the fuel pump assembly is fully-inserted into the fuel tank, from the insertable end to the flange.

FIGS. 13-15 show the fuel pump assembly 30 being aligned with the opening of the fuel tank 28 and inserted into an opening 220 of the fuel tank 28. The fuel pump assembly 30 is in the compact state and the insertable end 60 and the radial flange 78 are in alignment with the longitudinal axis A, which is coaxial with a center axis of the opening 220, which is sized to receive the insertable wall 80 of the fuel pump assembly 30. The radial flange 78 and the insertable end 60 are moved straight along the longitudinal axis A from a position where the insertable end 60 initially enters an opening 220 to a position where the radial flange 78 engages the fuel tank 28.

The radial centers of the insertable end 60 and the top cover 66 remain disposed on the longitudinal axis A throughout the axial movement of the radial flange 78 and the insertable end 60, without tilting the radial flange 78 and without tilting the insertable end 60 relative to the longitudinal axis A. For example, initially the external filter 114 is resiliently bent toward the radial flange 78 (as shown in FIG. 4 and mentioned above) as the insertable end 60 enters the opening 220.

Next, the lower bent portion 200 is resiliently bent as the upper bent portion 202 is urged radially inward by the radially inwardly facing surface of the fuel tank 28 that forms the opening 220. As the insertable end 60 continues into the fuel tank 28 along the longitudinal axis A, the rotatable arm 172 moves out of engagement with the radially inwardly facing surface and the rotatable arm 172 is able to return to its natural shape.

Next, the bent portions 200 and 202 are resiliently bent as the float 176 is urged radially inwardly by the radially inwardly facing surface of the fuel tank 28. As the insertable end 60 continues into the fuel tank 28 along the longitudinal axis A, the float 176 moves out of engagement with the radially inwardly facing surface and the rotatable arm 172 is able to return to its natural shape.

In an embodiment, the entire rotatable arm may resiliently deform, and/or other portions of the rotatable arm may deform, to allow the fuel pump assembly to fit into the opening of the fuel tank without tilting the fuel pump assembly relative to the longitudinal axis. In another embodiment, the external filter and/or the rotatable arm are configured such that bending of such components is not needed to insert the fuel pump assembly straight into the opening of the fuel tank. In yet another embodiment, the insertable end and the radial flange are tilted at first to insert the external filter, and movement of the insertable end and the radial flange is entirely along the longitudinal axis immediately after the external filter is inside the fuel tank.

According to one aspect of the invention, a pump assembly extends along a longitudinal axis. The pump assembly includes a cover at an external end of the pump assembly, the cover including a flange that extends radially outward of the longitudinal axis, an insertable end opposite the external end along the longitudinal axis, a fluid pump disposed between the insertable end and the flange, and a sender assembly for detecting a fluid level in the fluid tank, the sender assembly being disposed between the insertable end and the flange. The sender assembly is configured to transition into a compact state where the insertable end and the flange would be able to move straight along the longitudinal axis from a position where the insertable end initially enters an opening, with a radial extent that is less than the flange, to a position where the flange engages the fluid tank.

The insertable end may include a reservoir housing, the sender assembly may be fixed relative to the reservoir housing and may further include a rotatable arm that has a pivot end and a revolvable end that is rotatably fixed relative to the pivot end and configured to revolve about the pivot end, wherein the rotatable arm has a first position that indicates a first fluid level of the fluid tank, a second position that indicates a second fluid level of the fluid tank, and a compact position beyond the second position away from the first position, and when the rotatable arm is in the compact position, the sender assembly is in the compact state.

The rotatable arm may be flexible such that when the rotatable arm is in the compact position, the rotatable arm may be able to resiliently bend such that the rotatable arm has a radial extent, from the longitudinal axis, that is less than the flange.

The sender assembly may further include a float coupled to the revolvable end, and the float may be movable to a position where the float is entirely radially inward of a radial extent of the flange.

The first position may indicate that the first fluid level is one of a minimum fluid level or a maximum fluid level, the second position may indicate that the second fluid level is the other of the minimum fluid level or the maximum fluid level.

The pump assembly may further include an external filter external to an interior of the reservoir housing and fluidly connected to a first input port of the fluid pump, and an internal filter within the interior of the reservoir housing and fluidly connected to a second input port of the fluid pump.

A first radial center of the insertable end and a second radial center of the flange may be disposed on the longitudinal axis, and when the sender assembly is in the compact state the first radial center and the second radial center may be able to remain on the longitudinal axis and move straight along the longitudinal axis from the position where the insertable end initially enters the opening, to the position where the flange engages the fluid tank.

The pump assembly may further include a fuel tube fluidly connecting an outlet of the fluid pump with an outlet port of the cover.

The pump assembly may further include an abrasion sleeve circumscribing a length of the fuel tube.

The pump assembly may be a fuel pump assembly for attachment to a fuel tank of a vehicle.

A fuel tank assembly for a vehicle may include the fuel pump assembly and the fuel tank, and the fuel pump assembly may be attached to the fuel tank such that the insertable end of the fuel pump assembly is within the fuel tank and the flange is engaged with the fuel tank.

According to another aspect of the invention, a sender assembly for detecting a fluid level in a fluid tank. The sender assembly includes a sender housing, a variable resistor with a positive end and a grounded end opposite the positive end, a rotatable arm that has a pivot end and a revolvable end that is rotatably fixed relative to the pivot end and configured to revolve about the pivot end, wherein the rotatable arm is pivotably mounted at a position that is fixed relative to the variable resistor at the pivot end such that the revolvable end is movable relative to the sender housing, and a wiper that is rotatably fixed relative to the pivot end such that the wiper revolves about the pivot end when the rotatable arm revolves about the pivot end, wherein the wiper is engageable with the variable resistor such that revolving the wiper about the pivot end in a first rotation direction between the positive end and the grounded end progressively increases an electrical resistance, between the positive end and the grounded end, from a minimum resistance toward a maximum resistance or progressively decreases the electrical resistance from the maximum resistance toward the minimum resistance. When the revolvable end revolves about the pivot end in the first rotation direction the wiper revolves about the pivot end in the first rotation direction, and the wiper is configured to stop revolving in the first direction when the wiper reaches a first position where the electrical resistance is one of the maximum resistance or the minimum resistance, the wiper is configured to be revolvable away from the first position to a second position where the electrical resistance is the other of the maximum resistance or the minimum resistance, and the wiper is configured to be revolvable to a third position, beyond the second position away from the first position, where the wiper would be at least partially disengaged from the variable resistor.

The wiper may be in the third position such that the wiper is at least partially disengaged from the variable resistor.

The wiper may be entirely disengaged from the variable resistor.

The wiper may be configured to rotate about the pivot end anywhere from 30° to 60° beyond the second position to reach the third position.

The sender housing may form a first stop surface and a second stop surface, and the first stop surface may be configured to stop the wiper in the first position, and the second stop surface may be configured to stop the wiper in the third position.

The rotatable arm may be formed by a wire with a zig-zag shape within a plane parallel to the longitudinal axis.

A pump assembly may include the sender assembly and a fluid pump.

According to another aspect of the invention, a method of assembling a tank assembly that includes a fluid tank and a pump assembly, which includes a flange spaced apart from an insertable end of the pump assembly along a longitudinal axis and includes a sender assembly disposed between the insertable end and the flange. The method includes inserting the insertable end axially along the longitudinal axis into the opening until the flange engages the fluid tank, wherein the insertable end and the flange move straight along the longitudinal axis from a position where the insertable end initially enters the opening to a position where the flange engages the fluid tank.

The pump assembly may be a fuel pump assembly and the fluid tank may be a fuel tank for an automobile.

Any of the above aspects may be combined with any of the other aspects. Also, any of the above features may be combined with any of the above aspects and/or any of the other above features.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pump assembly extending along a longitudinal axis, the pump assembly including:
   a cover at an external end of the pump assembly, the cover including a flange that extends radially outward of the longitudinal axis;
   an insertable end opposite the external end along the longitudinal axis;

a fluid pump disposed between the insertable end and the flange; and a sender assembly for detecting a fluid level in a fluid tank, the sender assembly being disposed between the insertable end and the flange;

wherein the sender assembly is configured to transition into a compact state where the insertable end and the flange would be able to move straight along the longitudinal axis, which is coaxial with a center axis of an opening of the fluid tank, from a position where the insertable end initially enters the opening, with a radial extent that is less than the flange, to a position where the flange engages the fluid tank, wherein the insertable end includes a reservoir housing; and wherein the sender assembly is fixed relative to the reservoir housing and further includes:

a rotatable arm that has a pivot end and a revolvable end that is rotatably fixed relative to the pivot end and configured to revolve about the pivot end to move a wiper configured to engage a variable resistor, wherein the rotatable arm revolves to move the wiper from a first position that indicates a first fluid level of the fluid tank, to a second position that indicates a second fluid level of the fluid tank, and to a compact position beyond the second position away from the first position in which the wiper disengages with the variable resistor; and wherein when the rotatable arm is in the compact position, the sender assembly is in the compact state.

2. The pump assembly of claim 1, wherein the rotatable arm is flexible such that when the rotatable arm is in the compact position, the rotatable arm is able to resiliently bend such that the rotatable arm has a radial extent, from the longitudinal axis, that is less than the flange.

3. The pump assembly of claim 1, wherein the sender assembly further includes:

a float coupled to the revolvable end, wherein the float is movable to a position where the float is entirely radially inward of a radial extent of the flange.

4. The pump assembly of claim 1, wherein the first position indicates that the first fluid level is one of a minimum fluid level or a maximum fluid level, the second position indicates that the second fluid level is the other of the minimum fluid level or the maximum fluid level.

5. The pump assembly of claim 1, wherein the pump assembly further includes:

an external filter external to an interior of the reservoir housing and fluidly connected to a first input port of the fluid pump; and an internal filter within the interior of the reservoir housing and fluidly connected to a second input port of the fluid pump.

6. The pump assembly of claim 1, wherein a first radial center of the insertable end and a second radial center of the flange are disposed on the longitudinal axis, and when the sender assembly is in the compact state the first radial center and the second radial center are able to remain on the longitudinal axis and move straight along the longitudinal axis from the position where the insertable end initially enters the opening, to the position where the flange engages the fluid tank.

7. The pump assembly of claim 1, wherein the pump assembly further includes:

a fuel tube fluidly connecting an outlet of the fluid pump with an outlet port of the cover.

8. The pump assembly of claim 6, further including:

an abrasion sleeve circumscribing a length of a fuel tube that extends from the cover to the fuel pump.

9. The pump assembly of claim 1, wherein the pump assembly is a fuel pump assembly for attachment to the fluid tank which is a fuel tank of a vehicle.

10. A fuel tank assembly for a vehicle, including:

the fuel pump assembly of claim 9; and the fuel tank;

wherein the fuel pump assembly is attached to the fuel tank such that the insertable end of the fuel pump assembly is within the fuel tank and the flange is engaged with the fuel tank.

11. A pump assembly extending along a longitudinal axis, the pump assembly including:

a cover at an external end of the pump assembly, the cover including a flange that extends radially outward of the longitudinal axis;

an insertable end opposite the external end along the longitudinal axis;

a fluid pump disposed between the insertable end and the flange; and a sender assembly for detecting a fluid level in a fluid tank, the sender assembly disposed between the insertable end and the flange and including a rotatable arm that has a pivot end and a revolvable end that is rotatably fixed relative to the pivot end and configured to revolve about the pivot end to move a wiper configured to slidably engage a variable resistor to indicate the fluid level, wherein the rotatable arm revolves from a first position that indicates a first fluid level of the fluid tank, to a second position that indicates a second fluid level of the fluid tank, and to a compact position beyond the second position away from the first position in which the wiper disengages from the variable resistor.

12. The pump assembly of claim 11, wherein the rotatable arm is flexible such that when the rotatable arm is in the compact position, the rotatable arm is able to resiliently bend such that the rotatable arm has a radial extent, from the longitudinal axis, that is less than the flange.

13. The pump assembly of claim 11, wherein the sender assembly further includes:

a float coupled to the revolvable end, wherein the float is movable to a position where the float is entirely radially inward of a radial extent of the flange.

14. The pump assembly of claim 11, wherein the first position indicates that the first fluid level is one of a minimum fluid level or a maximum fluid level, the second position indicates that the second fluid level is the other of the minimum fluid level or the maximum fluid level.

15. The pump assembly of claim 11, wherein the pump assembly further includes:

an external filter external to an interior of the reservoir housing and fluidly connected to a first input port of the fluid pump; and an internal filter within the interior of the reservoir housing and fluidly connected to a second input port of the fluid pump.

* * * * *